United States Patent [19]

Osaka

[11] Patent Number: 5,786,968
[45] Date of Patent: Jul. 28, 1998

[54] MAGNETIC HEAD CARRIAGE DEVICE HAVING A HEAD LOAD SPRING GUIDE MECHANISM

[75] Inventor: Tomohiko Osaka, Yamagata, Japan

[73] Assignee: Mitsumi Electric Co., Ltd., Tokyo, Japan

[21] Appl. No.: 785,528

[22] Filed: Jan. 17, 1997

[30] Foreign Application Priority Data

Jan. 19, 1996 [JP] Japan ................ 8-007740

[51] Int. Cl.$^6$ ................ G11B 5/54; G11B 21/16
[52] U.S. Cl. ................ 360/104; 360/105
[58] Field of Search ................ 360/104, 105, 360/109, 99.02

[56] References Cited

FOREIGN PATENT DOCUMENTS

| | | | |
|---|---|---|---|
| 62-172557 | 7/1987 | Japan | 360/104 |
| 63-58684 | 3/1988 | Japan | 360/104 |
| 7-044978 | 2/1995 | Japan | |

*Primary Examiner*—Robert S. Tupper
*Assistant Examiner*—William J. Limowicz
*Attorney, Agent, or Firm*—Michael N. Meller

[57] ABSTRACT

A magnetic head carriage device includes a carriage base on which a lower head is mounted, and an upper arm on which an upper head confronting the lower head is mounted, the upper arm having a width in a lateral direction and a base portion at which the upper arm is fixed to the carriage base, the upper arm being vertically movable to the carriage base around the base portion. A head load spring exerts a downward actuating force on the upper arm such that the upper arm is pressed toward the carriage base, the head load spring having an end portion at which the head load spring downwardly presses the upper arm and a base portion at which the head load spring is fixed to the carriage base. A spring guide mechanism restricts a movement of the end portion of the head load spring in the lateral direction such that the end portion is maintained in the center of the width of the upper arm.

5 Claims, 7 Drawing Sheets

MAGNETIC HEAD CARRIAGE DEVICE HAVING A HEAD LOAD SPRING GUIDE MECHANISM

BACKGROUND OF THE INVENTION (1) Field of the Invention

The present invention generally relates to a magnetic head carriage device, and more particularly to a magnetic head carriage device including a head load spring which exerts a downward actuating force on an upper arm such that the upper arm is pressed toward a carriage base.

(2) Description of the Related Art

Generally, a magnetic disk drive, such as a floppy disk drive, includes a magnetic head carriage device. In the magnetic disk drive, a read/write head held on the magnetic head carriage device is moved to a desired position on a magnetic disk so that the disk drive reads data from and/or writes data onto the magnetic disk by using the head.

FIGS. 1, 2 and 3 show an example of a conventional magnetic head carriage device for use in a magnetic disk drive. As shown in FIGS. 1 and 2, the magnetic head carriage device 1 generally has a carriage base 3 on which a lower head 2 is mounted, and an upper arm 5 on which an upper head 4 is mounted. A pair of leaf springs 6 are provided between the carriage base 3 and the upper arm 5, and connect the upper arm 5 and the carriage base 3 such that the upper arm 5 is vertically movable to the carriage base 3 or vertically rotatable around a base portion of the upper arm 5, the base portion being fixed to the carriage base 3 via the leaf springs 6. A head load spring 7 is also provided between the carriage base 3 and the upper arm 5, and exerts a downward actuating force on the upper arm 5 such that the upper arm 5 is pressed toward the carriage base 3. The head load spring 7 has an end portion 7a which is connected to a connecting portion 8 on the upper arm 5 and downwardly presses the upper arm 5. The connecting portion 8 is fixed to the upper arm 5. The head load spring 7 has a base portion at which the head load spring 7 is fixed to the carriage base 3.

In the above-described device 1, a magnetic disk (not shown) is interposed between the lower head 2 and the upper head 4 when data is read from or written onto the magnetic disk. In order to provide a good sliding condition of the upper head 4 on the magnetic disk when the magnetic disk is accessed, it is necessary that the end portion 7a of the head load spring 7 always downwardly presses the upper arm 5 in the center of the width of the upper arm 5 in the lateral direction of the device 1. The connecting portion 8 has a V-groove in which the end portion 7a of the head load spring 7 is fitted.

Therefore, the above-described device 1 can provide a good sliding condition of the upper head 4 on the magnetic disk when the end portion 7a of the head load spring 7 is connected to the V-groove of the connecting portion 8.

However, in the above-described device 1, there is provided no mechanism which restricts a movement of the end portion 7a of the head load spring 7 in the lateral direction. The above-described device 1 has no element which stably maintains the end portion 7a of the head load spring 7 in the center of the width of the upper arm 5 in the lateral direction.

As shown in FIG. 3, the connecting portion 8 of the above-described device 1 has a small width, indicated by the arrow "L", in the lateral direction. The width L of the connecting portion 8 is too small to stably maintain the end portion 7a of the head load spring 7 in the center of the width of the upper arm 5. Also, the configuration of the connecting portion 8 is not appropriate for correcting the position of the head load spring 7 when it is disconnected from the connecting portion 8. Further, there is no mechanism which restricts the movement of the end portion 7a of the head load spring 7 in the lateral direction.

As indicated by a dotted line in FIG. 3, the end portion 7a of the head load spring 7 is likely to be disconnected from the connecting portion 8 on the upper arm 5. When the end portion 7a is disconnected from the connecting portion 8, the head load spring 7 does not downwardly press the upper arm 5 in the center of the width of the upper arm 5 in the lateral direction.

In such a condition, the above-described magnetic head carriage device 1 does not provide a good sliding condition of the upper head 4 on the upper arm 5, and it is difficult for the disk drive to correctly carry out the recording and reproducing of data with the magnetic disk by using the upper head 4 on the magnetic head carriage device 1. Further, if the end portion 7a is disconnected from the connecting portion 8, fitting the end portion 7a of the head load spring 7 into the V-groove of the connecting portion 8 again is troublesome.

SUMMARY OF THE INVENTION

An object of the present invention is to provide an improved magnetic head carriage device in which the above-described problems are eliminated.

Another object of the present invention is to provide a magnetic head carriage device which effectively prevents the disconnection of the end portion of the head load spring from the center of the width of the upper arm, in order to provide a stable, good sliding condition of the upper head on the upper arm when data is read from or written onto the magnetic disk.

The above-mentioned objects of the present invention are achieved by a magnetic head carriage device which includes: a carriage base on which a lower head is mounted; an upper arm on which an upper head confronting the lower head is mounted, the upper arm having a width in a lateral direction and a base portion at which the upper arm is fixed to the carriage base, the upper arm being vertically movable to the carriage base around the base portion; a head load spring which exerts a downward actuating force on the upper arm such that the upper arm is pressed toward the carriage base, the head load spring having an end portion at which the head load spring downwardly presses the upper arm and a base portion at which the head load spring is fixed to the carriage base; and a spring guide mechanism which guides a movement of the end portion of the head load spring in the lateral direction such that the end portion is maintained in the center of the width of the upper arm.

In the magnetic head carriage device of the present invention, the end portion of the head load spring can be maintained in the center of the width of the upper arm. It is possible for the present invention to provide a stable, good sliding condition of the upper head on the magnetic disk when data is read from or written onto the magnetic disk. It is possible for the present invention to prevent the disconnection of the end portion of the head load spring from the center of the width of the upper arm.

BRIEF DESCRIPTION OF THE DRAWINGS

The above and other objects, features and advantages of the present invention will become more apparent from the following detailed description when read in conjunction with the accompanying drawings in which.

DETAILED DESCRIPTION OF THE PREFERRED EMBODIMENT

Figure 1:
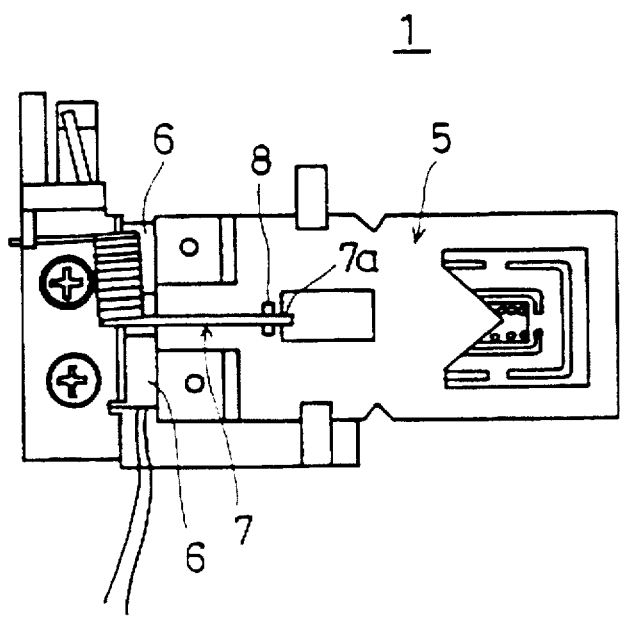
FIG. 1 is a plan view of a conventional magnetic head carriage device.
Figure 2:
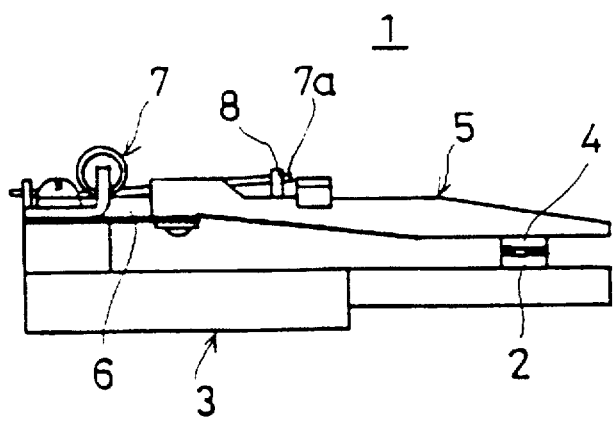
FIG. 2 is a side view of the magnetic head carriage device in FIG. 1.

A description will now be given of the preferred embodiment of the present invention with reference to the accompanying drawings.

FIGS. 4 through 7 show a magnetic head carriage device 10 in one embodiment of the present invention. FIG. 4, FIG. 5, FIG. 6 and FIG. 7 are a plan view, a side view, a bottom view and a rear view of the magnetic head carriage device 10 of the present embodiment, respectively. In FIGS. 4 through 7, a longitudinal direction of the magnetic head carriage device 10 is indicated by the arrow "X1–X2", a lateral direction of the magnetic head carriage device 10 is indicated by the arrow "Y1–Y2", and a vertical direction of the magnetic head carriage device 10 is indicated by the arrow "Z1–Z2".

The magnetic head carriage device 10 in FIGS. 4 through 7 is installed in, for example, a 3.5-inch floppy disk drive for use therein. The magnetic head carriage device 10 is arranged in the disk drive such that the magnetic head carriage device 10 is movable relative to a magnetic disk (a 3.5-inch floppy disk) along a guide shaft (not shown) of the disk drive. The magnetic head carriage device 10 is connected to a drive shaft of a stepping motor (not shown) of the disk drive, and a control of the rotation of the stepping motor is carried out to move the magnetic head carriage device 10 relative to the magnetic disk in the disk drive. A read/write head on the magnetic head carriage device 10 is moved by the rotation of the stepping motor to a desired position on the magnetic disk, so that the disk drive reads data from and/or writes data onto the magnetic disk by using the head.

The magnetic head carriage device 10 generally has an upper head 11, a lower head 12, a carriage base 13, an upper arm 14, leaf springs 15, a head load spring 16, and a spring guide mechanism 17. The spring guide mechanism 17 constitutes a major element of the present invention which will be described later.

The upper head 11 and the lower head 12 are made in, for example, a structure in which a tunnel-erase core is held by a ceramic slider. Each of the upper head 11 and the lower head 12 is protected by a shield material in order to avoid including disturbances in signals generated by the read/write head.

The carriage base 13 is a resin-molded member which is made through resin molding. In the resin-molded carriage base 13, a main body 18, a guide-shaft inserting portion 19, a drive-shaft connecting portion 20, an arm mounting portion 21, and a spring holder portion 22 are integrally formed. The lower head 12 is mounted on the main body 18 of the carriage base. The guide shaft of the disk drive is inserted to the guide-shaft inserting portion 19 such that the carriage base 13 is movable along the guide shaft. The drive shaft of the stepping motor is connected with the drive-shaft connecting portion 20. The upper arm 14 is mounted onto the arm mounting portion 21. The head load spring 16 is attached to the spring holder portion 22.

Figure 5:
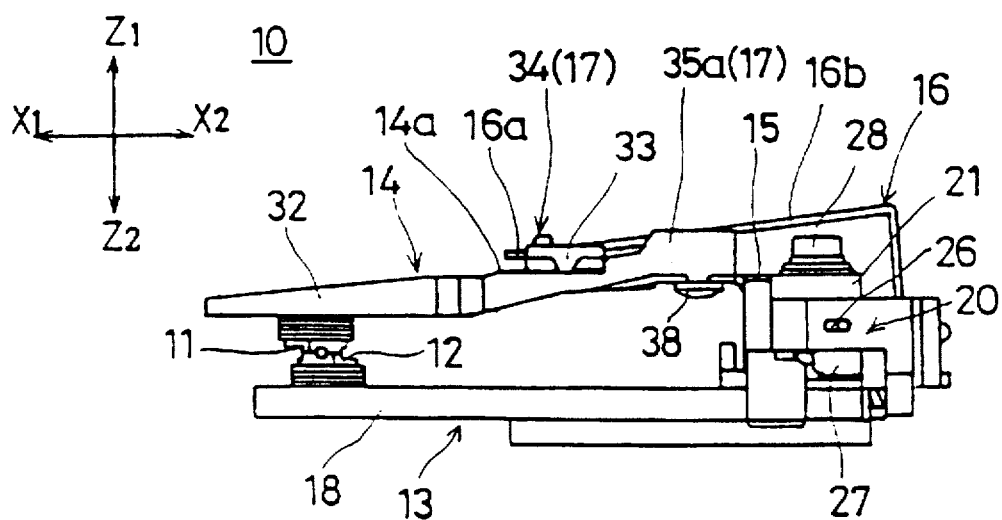
FIG. 5 is a side view of the magnetic head carriage device in FIG. 4.
Figure 6:
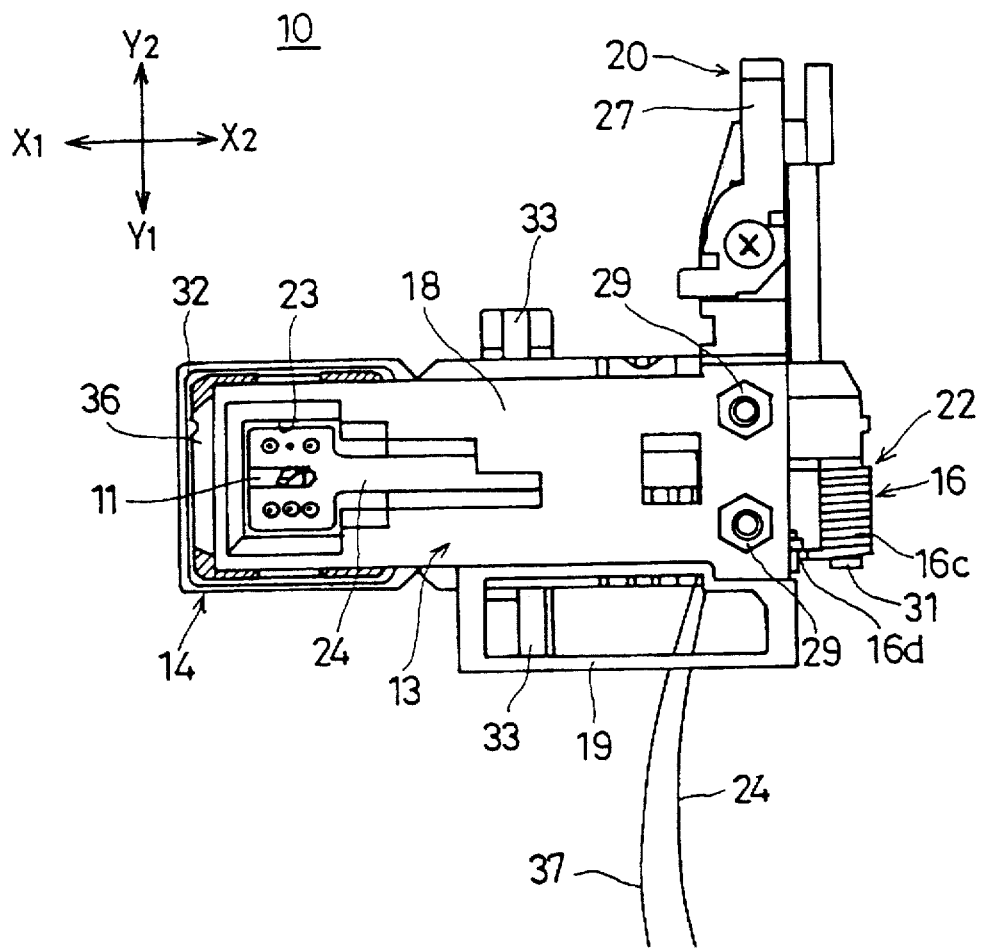
FIG. 6 is a bottom view of the magnetic head carriage device in FIG. 4.

As shown in FIGS. 5 and 6, the main body 18 is a base portion of the carriage base 13, and it has a generally rectangular form. The lower head 12 is fixed to an end portion (which extends in the direction X1) of the main body 18 by using an adhesive agent.

The main body 18 has an opening 23 at the end portion where the lower head 12 is fixed to the main body 18. A flexible printed circuit (FPC) cable 24 which is electrically connected to a rear surface of the lower head 12 passes through the opening 23 of the main body 18. The FPC cable 24 extending from the rear surface of the lower head 12 is bent at its intermediate portion, and the end of the FPC cable 24 is drawn out from one side of the main body 18 in the lateral direction Y1 in FIGS. 4 and 6.

Figure 4:
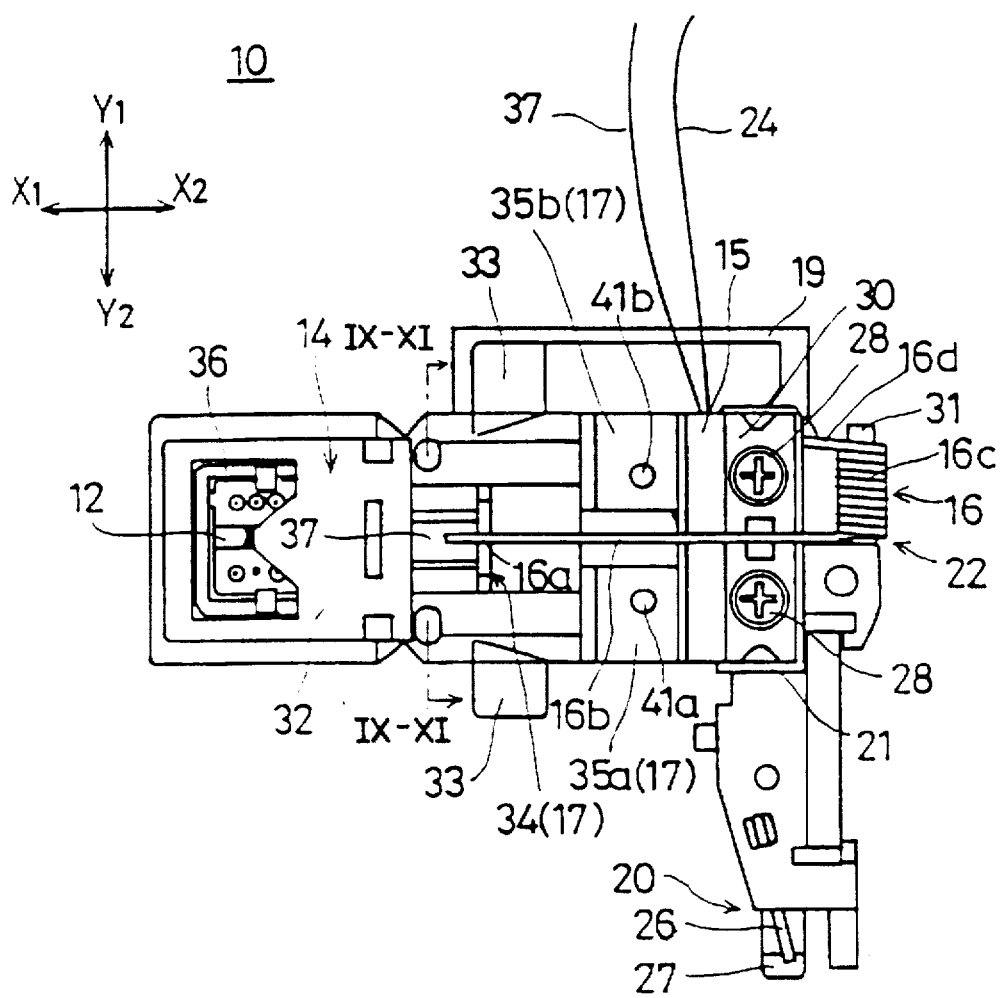
FIG. 4 is a plan view of a magnetic head carriage device in one embodiment of the present invention.
Figure 7:
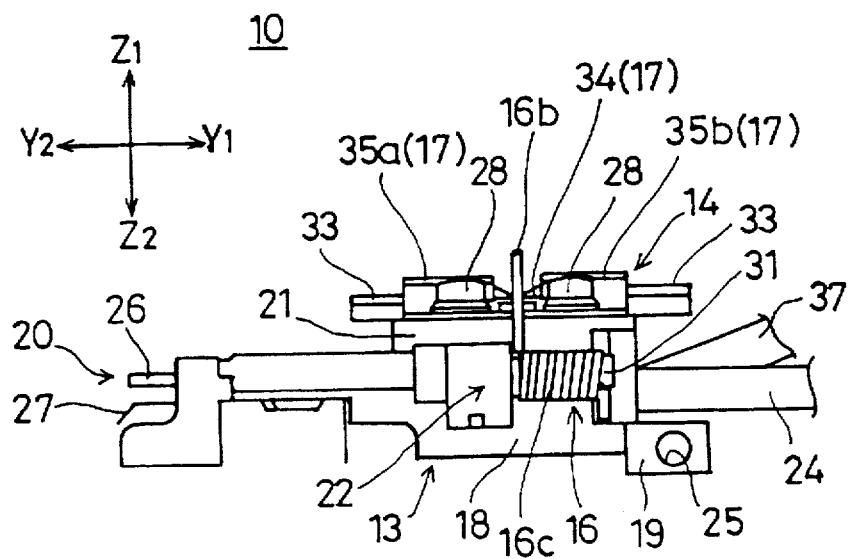
FIG. 7 is a rear view of the magnetic head carriage device in FIG. 4.

The guide-shaft inserting portion 19 of the carriage base 13 is formed such that it extends from one side of the main body 18 in the lateral direction Y1 in FIGS. 4 and 6. The guide-shaft inserting portion 19 includes an insertion hole 25 as shown in FIG. 7, and the insertion hole 25 extends in the longitudinal direction X1. The guide shaft is inserted into the insertion hole 25 of the guide-shaft inserting portion 19. Thus, as described above, the magnetic head carriage device 10 is movable to the magnetic disk along the guide shaft of the disk drive.

As shown in FIG. 6, the drive-shaft connecting portion 20 is arranged such that it extends from a base portion (which extends in the direction X2) of the main body 18 in the lateral direction Y2. A needle 26 is embedded into the edge of the drive-shaft connecting portion 20 as shown in FIG. 4. The needle 26 is connected to a screw groove of the drive shaft of the disk drive. A pressing spring 27 is attached to the drive-shaft connecting portion 20 such that the pressing spring 27 exerts an upward actuating force on the screw groove of the drive shaft so as to ensure the connection of the needle 26 and the screw groove of the drive shaft. When the magnetic head carriage device 10 is arranged in the disk drive, the drive shaft is held between the needle 26 and the pressing spring 27. By the pressing spring 27, disconnection of the needle 26 from the screw groove of the drive shaft is prevented.

The arm mounting portion 21 is a base member arranged on the base portion (which extends in the direction X2) of the main body 18, and fixing screws 28 are fastened to the top surface of the arm mounting portion 21 to connect the leaf springs 15 to the carriage base 13. As shown in FIG. 6, hexagonal nuts 29 are attached to the fixing screws 28 to ensure the connection of the leaf springs 15 and the carriage base 13.

The upper arm 14 is mounted on the carriage base 13 via the leaf springs 15, and the fixing screws 28 are used to fix the ends of the leaf springs 15 to the arm mounting portion 21. In FIG. 4, reference numeral 30 indicates retaining plates which allow the fixing screws 28 to flatly fasten the leaf springs 15 by the nuts 29.

The spring holder portion 22 is arranged at the rear portion of the arm mounting portion 21. The head load spring 16 is attached to the spring holder portion 22. The spring holder portion 22 includes a holding shaft 31 which extends in the lateral direction Y1.

The head load spring 16 is a helical torsion spring which is made of a spring wire, and it includes an end portion 16a, an extension portion 16b, a coil portion 16c, and a base portion 16d. The head load spring 16 is arranged on the carriage base 13 such that the coil portion 16c is fitted to the holding shaft 31 of the spring holder portion 22, and the base portion 16d is fixed to the arm mounting portion 21.

Further, as shown in FIGS. 5 and 7, the extension portion 16b has two parts: one vertically extending from the coil portion 16c in the direction Z1 and bent at the boundary between the two parts; and the other part extending to the end portion 16a in the longitudinal direction X1 which faces a slantingly downward direction in the vertical plane.

The end portion 16a extending from the extension portion 16b in the head load spring 16 contacts the upper arm 14, and the head load spring 16 exerts a downward actuating force on the upper arm 14 such that the upper arm 14 is pressed toward the carriage base 13 by the actuating force of the spring 16.

The upper arm 14 is also a resin-molded member. In the resin-molded upper arm 14, a head mounting portion 32, a pair of arm portions 33, a connecting portion 34, and a pair of projecting portions 35a and 35b are integrally formed. In the present embodiment, the connecting portion 34 and the projecting portions 35a and 35b form the spring guide mechanism 17 which is a major element of the present invention.

As described above, the upper arm 14 is mounted on the carriage base 13 via the leaf springs 15, and the fixing screws 28 are used to fix the ends of the leaf springs 15 to the arm mounting portion 21 as shown in FIG. 5. Therefore, the upper arm 14 is vertically movable to the carriage base 13 by the resilient deformation of the leaf springs 15.

In the upper arm 14, the head mounting portion 32 is a portion of the upper arm 14 on which the upper head 11 is mounted. The head mounting portion 32 has a region confronting the lower head 12 on the carriage base 13, and a gimbal spring 36 is arranged in this region of the head mounting portion 32. The upper head 11 is fixed to the region of the head mounting portion 32. The upper head 11 is flexibly movable and can follow fluctuations or vibrations of the magnetic disk by the resilient deformation of the gimbal spring 36.

A flexible printed circuit (FPC) cable 37 is electrically connected to a rear surface of the upper head 11, and the FPC cable 37 extending from the rear surface of the upper head 11 is bent at its intermediate portion, and the end of the FPC cable 37 is drawn out from one side of the main body 18 in the lateral direction Y1 in FIGS. 4 and 6, similarly to the end of the FPC cable 24.

The arm portions 33 extending from both sides of the main body 18 in the lateral directions Y1 and Y2 are used to separate the magnetic disk from the upper head 11 and the lower head 12 when the magnetic disk is loaded into or unloaded from the disk drive. The arm portions 33 are connected to a disk ejection mechanism (not shown) of the disk drive.

When the magnetic disk is ejected from the disk drive by the disk ejection mechanism, the upper arm 14 is moved upward (in the direction Z1 in FIG. 5) by raising the arm portions 33 of the upper arm 14. When the magnetic disk is loaded into the disk drive, the upper arm 14 is moved downward (in the direction Z2 in FIG. 5) by lowering the arm portions 33 of the upper arm 14.

Next, FIGS. 8 through 11B show the spring guide mechanism 17 of the magnetic head carriage device 10. The spring guide mechanism 17 is provided on the upper arm 14. In FIGS. 8 through 11B, the longitudinal direction of the magnetic head carriage device 10 is indicated by the arrow "X1–X2", the lateral direction of the magnetic head carriage device 10 is indicated by the arrow "Y1–Y2", and the vertical direction of the magnetic head carriage device 10 is indicated by the arrow "Z1–Z2".

Figure 8:
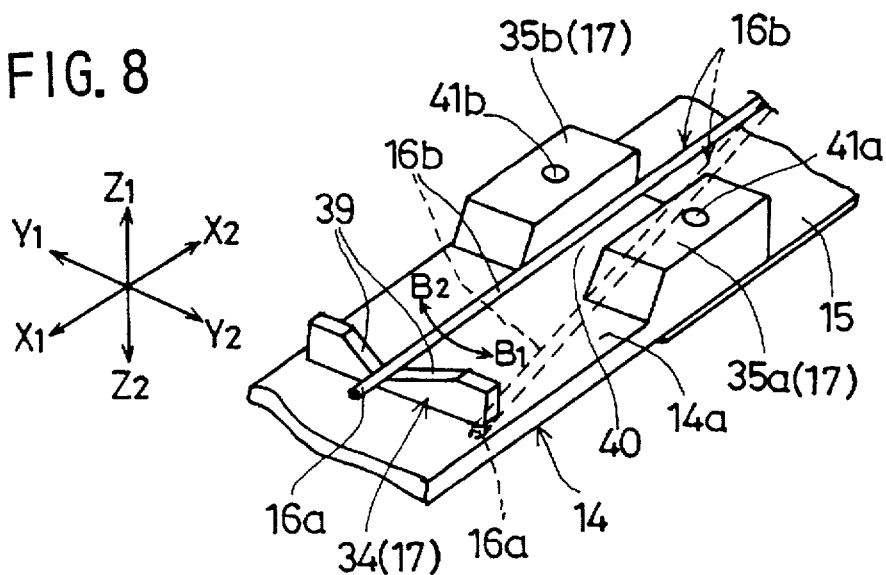
FIG. 8 is a perspective view of a spring guide mechanism of the magnetic head carriage device in FIG. 4.
Figure 9A:
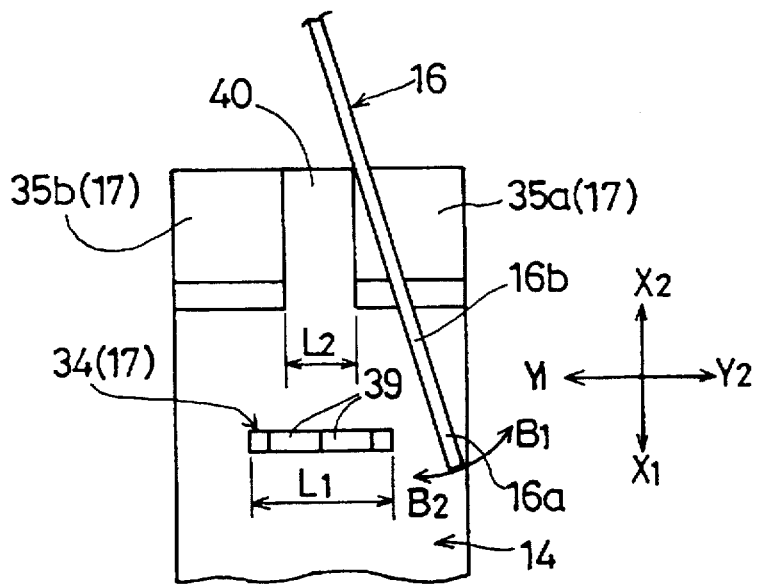
FIGS. 9A, 9B, 10A, 10B, 11A and 11B are diagrams for explaining an operation of the spring guide mechanism in FIG. 8.
Figure 9B:
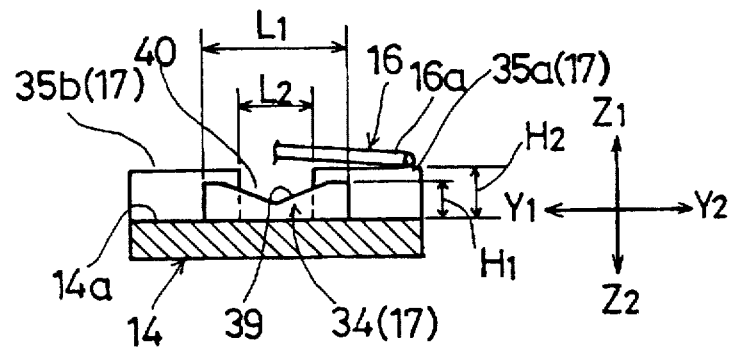
Figure 10A:
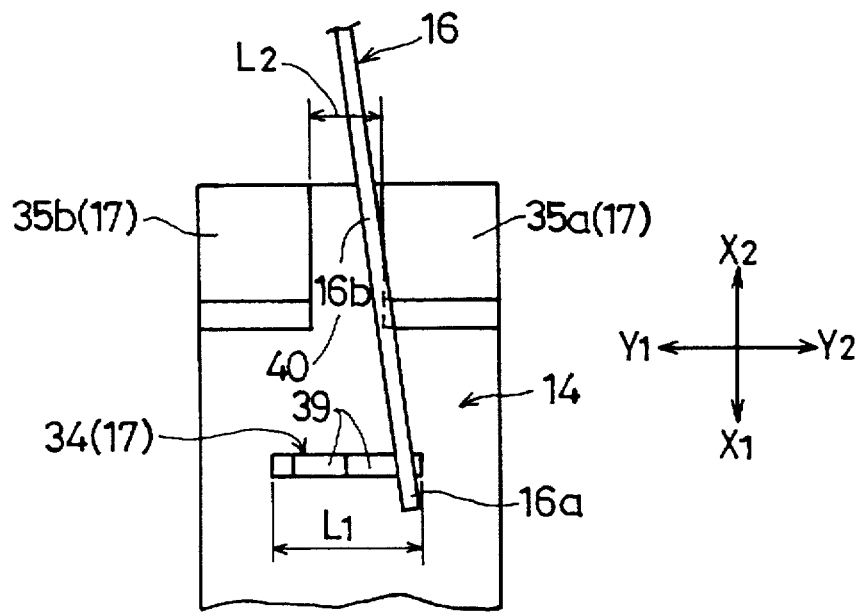
Figure 10B:
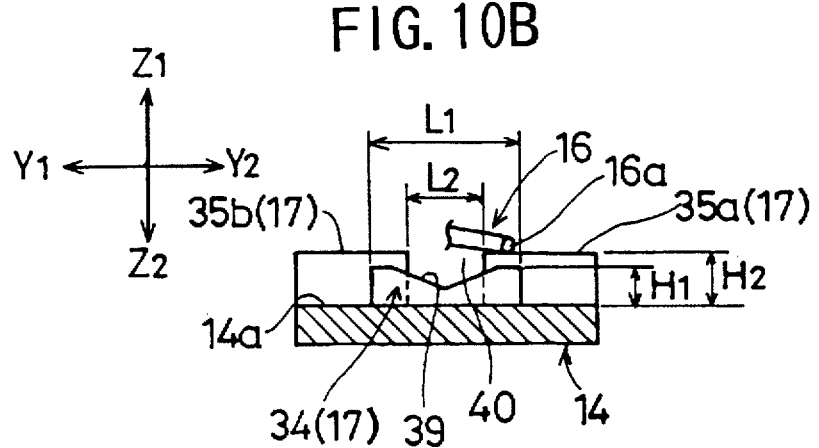
Figure 11A:
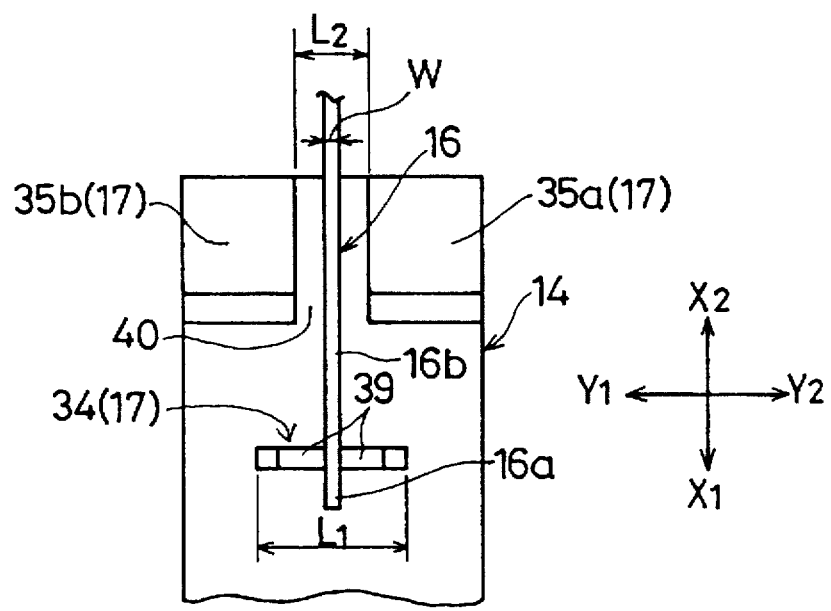
Figure 11B:
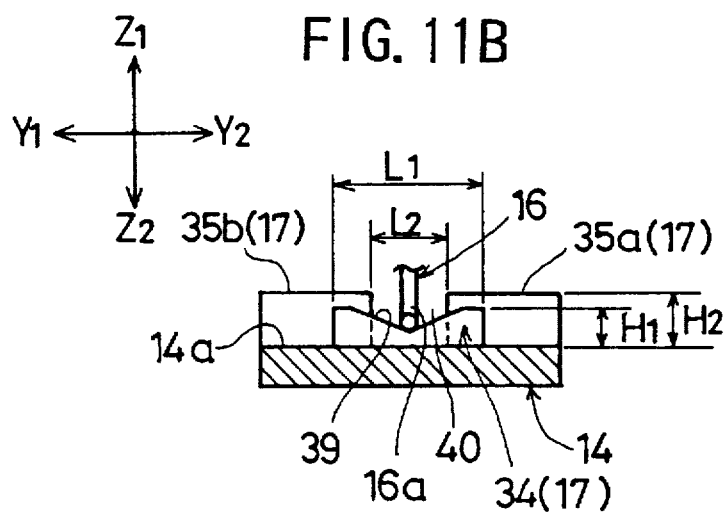

FIG. 8 shows the spring guide mechanism 17 of the magnetic head carriage device in FIG. 4. FIGS. 9A, 9B, 10A, 10B, 11A and 11B show an operation of the spring guide mechanism 17. FIGS. 9A, 10A and 11A are plan views of the spring guide mechanism 17, and FIGS. 9B, 10B and 11B are cross-sectional views of the spring guide mechanism 17 each taken along a line "A—A" in FIG. 4.

The spring guide mechanism 17 includes the connecting portion 34 on the top of the upper arm 14. The end portion 16a of the head load spring 16 is connected to the connecting portion 34 such that the end portion 16a is maintained in the center of the width of the upper arm 14, the width extending in the direction Y1 or Y2 in FIGS. 8 through 11B.

As shown in FIGS. 8 through 11B, the connecting portion 34 includes a V-groove 39 having a lowest part, the lowest part being located in the center of the width of the upper arm 14. As the head load spring 16 exerts the downward actuating force on the upper arm 14 in the direction Z2, the end portion 16a of the head load spring 16 is easily guided to the V-groove 39 of the connecting portion 34 when the head load spring 16 is connected to the connecting portion 34. The end portion 16a of the head load spring 16 is normally located in the center of the width of the upper arm 14. Hereinafter, the abovementioned condition in which the end portion 16a is located at the lowest part of the V-groove 39 of the connecting portion 34 is called the normal condition of the head load spring 16.

The spring guide mechanism 17 includes the pair of projecting portions 35a and 35b on the upper arm 14. The projecting portions 35a and 35b are arranged near the base portion 16d at which the head load spring 16 is fixed to the carriage base 13. In other words, the projecting portions 35a and 35b are arranged near the base portion (which extends in the direction X2) of the upper arm 14 at which the upper arm 14 is fixed to the carriage base 13.

There is provided a recess 40 between the projecting portions 35a and 35b. The head load spring 16 passes through the recess 40 and is interposed between the projecting portions 35a and 35b. More specifically, when the head load spring 16 is set in the normal condition mentioned above, the extension portion 16b of the head load spring 16 enters the recess 40 between the projecting portions 35a and 35b on the upper arm 14. The projecting portions 35a and 35b guide the movement of the end portion 16a of the head load spring 16 in the lateral direction.

As shown in FIG. 8, threaded holes 41a and 41b in top surfaces of the projecting portions 35a and 35b are formed respectively, and fixing screws 38 (shown in FIG. 5) are fitted into the threaded holes 41a and 41b so that the upper arm 14, the leaf springs 15 and the projecting portions 35a and 35b are fastened by the fixing screws 38.

In the present embodiment, the connecting portion 34 has a width in the lateral direction Y1–Y2, and the width of the connecting portion 34 is greater than a predetermined range of the movement of the end portion 16a of the head load spring 16 in the lateral direction Y1–Y2.

Further, in the present embodiment, a height of the projecting portions 35a and 35b on the upper arm 14 is greater than a height of the connecting portion 34 on the upper arm 14. As shown in FIGS. 9A through 11B, the connecting portion 34 and the projecting portions 35a and 35b are arranged such that the height H2 of the projecting portions 35a and 35b on a top surface 14a of the upper arm 14 is greater than the height H1 of the connecting portion 34 on the top surface 14a of the upper arm 14 (H2>H1). The height H1 of the connecting portion 34 on the top surface 14a of the upper arm 14 is the height of the highest part of the connecting portion 34 on the top surface 14a of the upper arm 14 in the vertical direction Z1–Z2.

Further, in the present embodiment, the width of the connecting portion 34 in the lateral direction is greater than the width of the recess 40 between the projecting portions 35a and 35b in the lateral direction. As shown in FIGS. 9A through 11B, the connecting portion 34 and the projecting portions 35a and 35b are arranged such that the width L1 of the connecting portion 34 in the lateral direction Y1–Y2 is greater than the width L2 of the recess 40 between the projecting portions 35a and 35b in the lateral direction Y1–Y2 (L1>L2).

Next, a description will be given of a function of the above-described spring guide mechanism 17 when an external force to move the end portion 16a of the head load spring 16 away from the lowest part of the V groove 39 of the connecting portion 34 is exerted on the head load spring 16.

When the above-mentioned external force is exerted on the head load spring 16, the end portion 16a of the head load spring 16 is forced to move from a position indicated by a solid line in FIG. 8 to a position indicated by a dotted line in FIG. 8 in a manner indicated by the arrow B1–B2. The function of the spring guide mechanism 17 in such a case will be described in greater detail in the following.

If the end portion 16a of the head load spring 16 is moved in the lateral direction Y1–Y2 within the width Li of the connecting portion 34, the end portion 16a easily returns back to the lowest part of the V-groove 39 of the connecting portion 34 in the center of the width of the upper arm 14 due to the elasticity of the head load spring 16.

If a greater external force is accidentally exerted on the head load spring 16 and the end portion 16a of the head load spring 16 goes outside the width Li of the connecting portion 34 as shown in FIGS. 9A and 9B, the head load spring 16 is moved onto the top surface of the projecting portion 35a and the end portion 16a is not brought into contact with the upper arm 14. As described above, the height H2 of the projection portions 35a and 35b on the upper arm 14 is greater than the height H1 of the connecting portion 34 on the upper arm 14, and the width Li of the connecting portion 34 is greater than the width L2 of the recess 40 between the projecting portions 35a and 35b.

After the head load spring 16 is moved onto the top surface of the projecting portion 35a, the end portion 16a of the head load spring 16 easily returns back to the lowest part of the V-groove 39 of the connecting portion 34 due to the elasticity of the head load spring 16. As the end portion 16a is not brought into contact with the top surface 14a of the upper arm 14, the side surface of the connecting portion 34 at the end of the range of the width L1 does not interfere with the end portion 16a when the end portion 16a is moved back to the lowest part of the V-groove 39 of the connecting portion 34.

Figure 3:
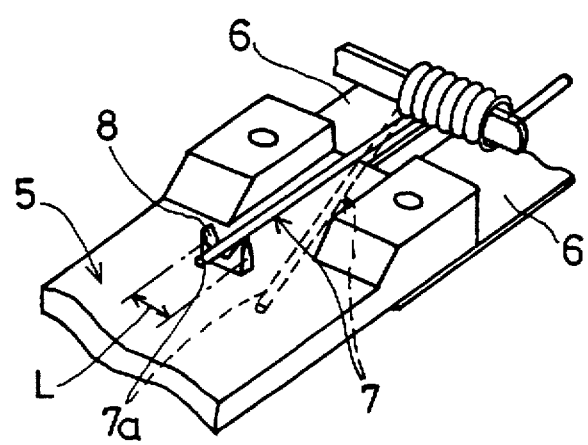
FIG. 3 is a perspective view of the magnetic head carriage device in FIG. 1.

On the contrary, in the conventional magnetic head carriage device 1 in FIG. 3, the side surface of the connecting portion 8 at the end of the range of the width L in the lateral direction interferes with the end portion 7a of the head load spring 7 when returning back to the V-groove of the connecting portion 8. If the end portion 7a is disconnected from the connecting portion 8, fitting the end portion 7a of the head load spring 7 into the V-groove of the connecting portion 8 again is troublesome.

FIGS. 10A and 10B show an intermediate condition of the spring guide mechanism 17 when the end portion 16a of the head load spring 16 returns back to the lowest part of the V-groove 39 of the connecting portion 34 in the direction Y1 after the head load spring 16 is moved onto the top surface of the projecting portion 35a in the direction Y2. As the head load spring 16 is moved from the top surface of the projecting portion 35a in the direction Y1 due to the elasticity of the head load spring 16, the head load spring 16 passes through an internal side wall of the projecting portion 35a as shown in FIGS. 10A and 10B. After this, the head load spring 16 separates from the top surface of the projecting portion 35a and the extension portion 16b of the head load spring 16 enters the recess 40 between the projecting portions 35a and 35b.

As described above, the width Li of the connecting portion 34 in the lateral direction is greater than the width L2 of the recess 40 between the projecting portions 35a and 35b in the lateral direction. When the extension portion 16b enters the recess 40, the end portion 16a of the head load spring 16 always enters the range of the width L1 of the connecting portion 34. The end portion 16a of the head load spring 16 is guided to the lowest part of the V-groove 39 of the connecting portion 34 by the spring guide mechanism 17, and the head load spring 16 is set in the normal condition, as shown in FIGS. 11A and 11B.

Accordingly, even when the end portion 16a of the head load spring 16 goes outside the width L1 of the connecting portion 34 due to the external force, the spring guide mechanism 17 serves to return the end portion 16a of the head load spring 16 back to the lowest part of the V-groove 39 of the connecting portion 34.

The magnetic head carriage device 10 of the present embodiment includes the above-described spring guide mechanism 17, and it is possible for the magnetic head carriage device 10 to reliably maintain the end portion 16a of the head load spring 16 in the center of the width of the upper arm in the lateral direction. Further, it is possible for the magnetic head carriage device 10 to provide a stable, good sliding condition of the upper head 11 on the magnetic disk when data is read from or written onto the magnetic disk by the head. The magnetic head carriage device 10 can effectively prevent the disconnection of the end portion 16a of the head load spring 16 from the center of the width of the upper arm 14.

In the above-described embodiment, the connecting portion 34 which upwardly extends from the top surface 14a of the upper arm 14 is formed. However, the present invention is not limited to the above-described embodiment, and modifications and variations may be made. For example, a V-grooved recess which is formed in the upper arm 14 may be used instead of the connecting portion 34 in the above-described embodiment.

Further, in the above-described embodiment, the head load spring 16 has a spring wire having a diameter (indicated by the arrow W in FIG. 11A) and a difference between the height of the head load spring 16 on the upper arm 14, at an intermediate location between the connecting portion 34 and the projecting portions 35a and 35b, and the height of the projecting portions 35a and 35b on the upper arm 14 is greater than the diameter W of the wire of the head load spring 16. It is possible for the spring guide mechanism 17 of the present embodiment to effectively prevent the end portion 16a of the head load spring 16 from separating from the connecting portion 34.

In the above-described embodiment, the projecting portions 35a and 35b are arranged near the base portion of the head load spring 16 at which the head load spring 16 is fixed to the carriage base 13. However, the present invention is not limited to the above-described embodiment, and the arrangement of the projecting portions 35a and 35b may be modified.

Further, the present invention is not limited to the above-described embodiment, and variations and modifications may be made without departing from the scope of the present invention.

What is claimed is:

1. A magnetic head carriage device for a magnetic disk drive in which a magnetic disk is accessed by an upper head and a lower head, said magnetic head carriage device comprising:

a carriage base on which the lower head is mounted;

an upper arm on which the upper head confronting the lower head is mounted, said upper arm having a width in a lateral direction and a base portion at which the upper arm is fixed to the carriage base, said upper arm being vertically movable to said carriage base around said base portion;

a head load spring for exerting a downward actuating force on said upper arm such that the upper arm is pressed toward the carriage base, said head load spring having an end portion at which the head load spring downwardly presses the upper arm and a base portion at which the head load spring is fixed to the carriage base; and spring guide means for guiding a movement of the end portion of the head load spring in the lateral direction such that the end portion is maintained in the center of the width of the upper arm, wherein said spring guide means comprises:

a pair of projecting portions on the upper arm adjacent to the base portion of the head load spring, the projecting portions having a recess between the projecting portions, the head load spring entering the recess when the end portion is in the center of the width of the upper arm; and a connecting portion on said upper arm adjacent to the end portion of the head load spring, the end portion of the head load spring being connected to said connecting portion, said connecting portion having a width in the lateral direction, said width of said connecting portion being greater than a predetermined range of the movement of the end portion of the head load spring in the lateral direction, and wherein a width of said connecting portion in the lateral direction is greater than a width of the recess between said projecting portions in the lateral direction.

2. The magnetic head carriage device according to claim 1, wherein a height of said projecting portions on the upper arm is greater than a height of said connecting portion on the upper arm.

3. The magnetic head carriage device according to claim 2 wherein said head load spring comprises an extension portion between said base portion and said end portion, said extension portion containing a first section having a height greater than the height of said projecting portions and a second section extending downwardly to said end portion of said spring to produce said downward actuating force.

4. The magnetic head carriage device according to claim 1, wherein said head load spring comprises a wire having a diameter, and a difference between a height of said head load spring on the upper arm at an intermediate location between the base portion and the end portion and a height of said projecting portions on the upper arm is greater than said diameter of said wire.

5. The magnetic head carriage device according to claim 1, wherein said head load spring comprises an extension portion between the base portion and the end portion, said extension portion entering the recess between the projecting portions when the end portion is in the center of the width of the upper arm.

* * * * *